United States Patent
Buddhavaram et al.

(10) Patent No.: US 10,819,944 B2
(45) Date of Patent: Oct. 27, 2020

(54) MOBILE WIRELESS DRIVE STORAGE FOR MOBILE PHONE USED AS CAR DASHBOARD CAMERA

(71) Applicant: Seagate Technology LLC, Cupertino, CA (US)

(72) Inventors: Chandra Shaker Buddhavaram, Fremont, CA (US); Jean-Pierre Ruster, San Jose, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 15/819,899

(22) Filed: Nov. 21, 2017

(65) Prior Publication Data
US 2018/0176501 A1 Jun. 21, 2018

Related U.S. Application Data

(60) Provisional application No. 62/435,503, filed on Dec. 16, 2016.

(51) Int. Cl.
| | |
|---|---|
| H04N 5/77 | (2006.01) |
| B01D 45/08 | (2006.01) |
| B01D 45/16 | (2006.01) |
| B01D 45/12 | (2006.01) |
| A47L 9/16 | (2006.01) |
| B01D 17/04 | (2006.01) |
| B01D 21/00 | (2006.01) |
| H04W 4/80 | (2018.01) |
| B01D 50/00 | (2006.01) |
| F01M 13/04 | (2006.01) |

(52) U.S. Cl.
CPC .............. *H04N 5/77* (2013.01); *A47L 9/1683* (2013.01); *B01D 17/045* (2013.01); *B01D 21/0042* (2013.01); *B01D 45/08* (2013.01); *B01D 45/12* (2013.01); *B01D 45/16* (2013.01); *B01D 50/002* (2013.01); *F01M 13/04* (2013.01); *H04W 4/80* (2018.02)

(58) Field of Classification Search
CPC ....... H04N 5/77; A47L 9/1683; B01D 17/045; B01D 21/0042
See application file for complete search history.

(56) References Cited

U.S. PATENT DOCUMENTS

| | | | |
|---|---|---|---|
| 6,439,205 B2 * | 8/2002 | Ushigome | F02M 37/106 123/509 |
| 9,058,100 B2 * | 6/2015 | Li | G06F 3/04883 |

(Continued)

FOREIGN PATENT DOCUMENTS

| | | |
|---|---|---|
| DE | 19917817 A1 | 10/2000 |
| GB | 2529559 A | 2/2016 |

(Continued)

*Primary Examiner* — Mishawn N. Hunter
(74) *Attorney, Agent, or Firm* — Westman, Champlin & Koehler, P.A.

(57) ABSTRACT

Systems and methods are disclosed that capture video in mobile applications and automatically archive the captured videos using short-range communications with a network storage device. In various embodiments, the archival is triggered by proximity to the wireless network device. In various embodiments, other triggers, such as those provided by location-based services are used to initiate archival via a wireless protocol.

20 Claims, 4 Drawing Sheets

(56) References Cited

U.S. PATENT DOCUMENTS

| | | | |
|---|---|---|---|
| 9,247,040 B1* | 1/2016 | Sutton | H04W 4/90 |
| 10,534,525 B1* | 1/2020 | Suchland | H04N 21/2743 |
| 2004/0125782 A1* | 7/2004 | Chang | G06F 3/0679 |
| | | | 370/338 |
| 2008/0204556 A1 | 8/2008 | de Miranda et al. | |
| 2008/0285886 A1 | 11/2008 | Allen | |
| 2009/0132676 A1* | 5/2009 | Tu | H04L 67/2823 |
| | | | 709/217 |
| 2014/0227980 A1* | 8/2014 | Esselink | H04B 1/3822 |
| | | | 455/73 |
| 2014/0340510 A1 | 11/2014 | Ihlenburg et al. | |
| 2014/0379384 A1* | 12/2014 | Duncan | G06Q 40/08 |
| | | | 705/4 |
| 2014/0379385 A1* | 12/2014 | Duncan | G06Q 40/08 |
| | | | 705/4 |
| 2015/0224929 A1 | 8/2015 | McCarthy et al. | |
| 2015/0312474 A1 | 10/2015 | Lavi et al. | |
| 2015/0339912 A1* | 11/2015 | Farrand | G08B 25/001 |
| | | | 340/501 |
| 2016/0006922 A1* | 1/2016 | Boudreau | H04N 5/23206 |
| | | | 348/207.1 |
| 2016/0055749 A1 | 2/2016 | Nicoll et al. | |
| 2016/0197837 A1* | 7/2016 | Fullerton | H04L 47/283 |
| | | | 370/238 |
| 2016/0197993 A1* | 7/2016 | Perkowski | H04L 67/1097 |
| | | | 709/203 |
| 2017/0028935 A1* | 2/2017 | Dutta | B60R 11/04 |
| 2017/0034470 A1* | 2/2017 | Kleinrock | H04L 67/12 |
| 2017/0344728 A1* | 11/2017 | Steele | G06F 21/10 |
| 2018/0035226 A1* | 2/2018 | Reijniers | H04S 7/304 |

FOREIGN PATENT DOCUMENTS

| | | | | |
|---|---|---|---|---|
| WO | WO-2006103437 A1 | | 10/2006 | |
| WO | WO-2015036798 A1 | | 3/2015 | |
| WO | WO 2015/177375 | * | 11/2015 | G07C 5/008 |

* cited by examiner

MOBILE WIRELESS DRIVE STORAGE FOR MOBILE PHONE USED AS CAR DASHBOARD CAMERA

CLAIM OF PRIORITY

This patent application claims the benefit of U.S. Provisional Patent Application No. 62/435,503, filed Dec. 16, 2016, entitled "MOBILE WIRELESS DRIVE STORAGE FOR MOBILE PHONE USED AS CAR DASHBOARD CAMERA", which is incorporated by reference herein in its entirety.

FIELD OF THE INVENTION

The present subject matter relates to network-based storage systems for mobile video applications.

BACKGROUND

The capture of video information in mobile applications is limited by the storage available to the video system. It is expensive to use cellular data transmissions to upload data to other storage devices. There is a need in the art for a system that can store mobile video information and archive it without incurring the expense of cellular data plans.

SUMMARY

Systems and methods are disclosed that capture video in mobile applications and automatically archive the captured videos. In various embodiments, the video is archived using short-range radio communications. In various embodiments, the archival is triggered by proximity to a wireless network device. In various embodiments, other triggers, such as those provided by location-based services are used to initiate archival via a wireless protocol.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE FIGURES

These and other features, aspects, and advantages of the present disclosure are better understood when the following Detailed Description is read with reference to the accompanying drawings.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Figure 1:
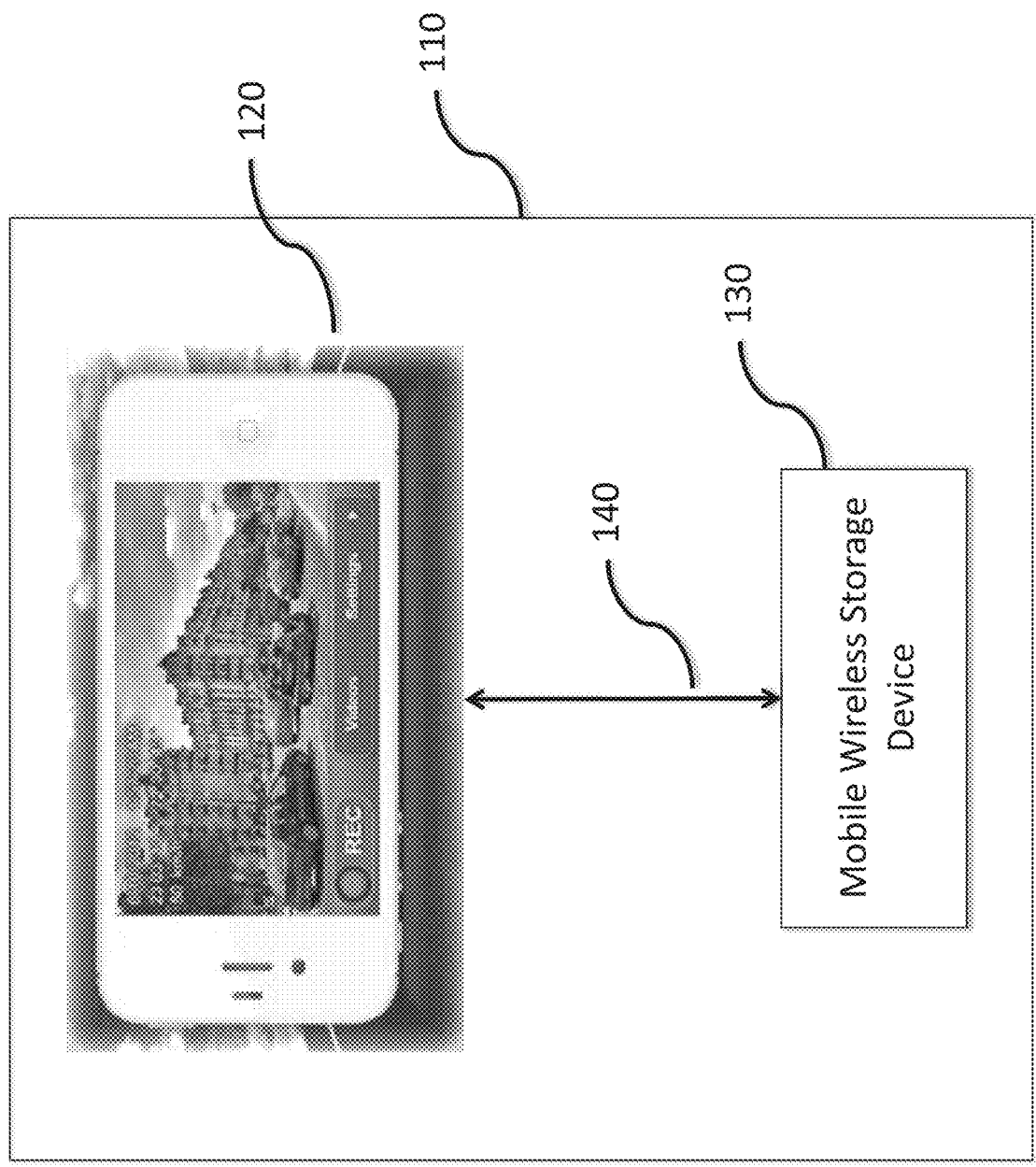
FIG. 1 is an example block diagram showing a mobile phone video system configured to store video information to a mobile wireless storage device, according to an embodiment of the present subject matter.

Systems and methods are disclosed that capture video in mobile applications and automatically archive the captured videos. FIG. 1 is an example block diagram showing a mobile phone video system configured to store video information to a mobile wireless storage device, according to an embodiment of the present subject matter. Mobile video device 120 is adapted to be placed in a vehicle 110, such as a car, boat, truck, or other vehicle. In autos, mobile video device 120 may be dashboard mounted to record driving information from the front window, rear window, hitch, or any other viewpoint. Mobile video device 120 can be any cellular phone, smart phone, personal digital device, or other mobile personal device with video recording capabilities, such as an iPad, video camera, or other video recording device. The mobile video device 120 can be in communication with a mobile wireless storage device 130 using a wired or wireless link 140. The mobile wireless storage device 130 has substantial data storage capacity to allow for saving the video information from the mobile video device 120. The mobile wireless storage device 130 also has wireless communications capabilities. Its wireless communications may be short-range or long-range communications. In various embodiments, the communications are a short-range wireless standard, such as BLUETOOTH compatible, IEEE 802.11 compatible, IEEE 802.6 compatible, WiMax, WiFi, or other wireless communications.

Most users have the mobile phones with them in car that can be used as a car dashboard camera to capture video for security and entertainment purposes. Since the amount of data available to user in the mobile phones is limited, it would be good to provide the user a large amount of storage to store all captured video in the car (mobile). Once the captured video is saved to a mobile wireless storage device, the user's mobile wireless device can be uploaded later to another device using the wireless network device. The videos can be deleted from the mobile phone to free up the phone memory for more videos or for other applications and uses. All video captures can be pushed automatically to mobile wireless storage and archived for later use. Some of the uses include, but are not limited to, security and entertainment purposes. One benefit of the present approach is that rather than use the cellular network and its attendant costs to upload the video data, the mobile wireless device is configured to use communications that do not require cellular service to save the videos to a wireless network device. Users will avoid additional data carrier costs since the transfer of data will be through communications, such as WiFi.

In various embodiments, the mobile wireless storage is a multipurpose drive and the use case of video archive from dashboard camera is only part of many other use cases such as streaming other audio/video to other mobile devices. The mobile phone application can keep recording the videos when in motion (e.g., driving in the automobile). In various embodiments, the storage takes place in blocks of 5 minutes videos and every 5 minutes the system can push and archive that video onto the mobile wireless storage device. The archived videos can be grouped by date, by time, by location, etc., and may be viewed by a user using the same application. While this recording and archiving in progress, user can in parallel stream videos, photos and music on the same or other devices. It is understood that other storage time frames may be employed without departing from the scope of the present subject matter.

Figure 2:
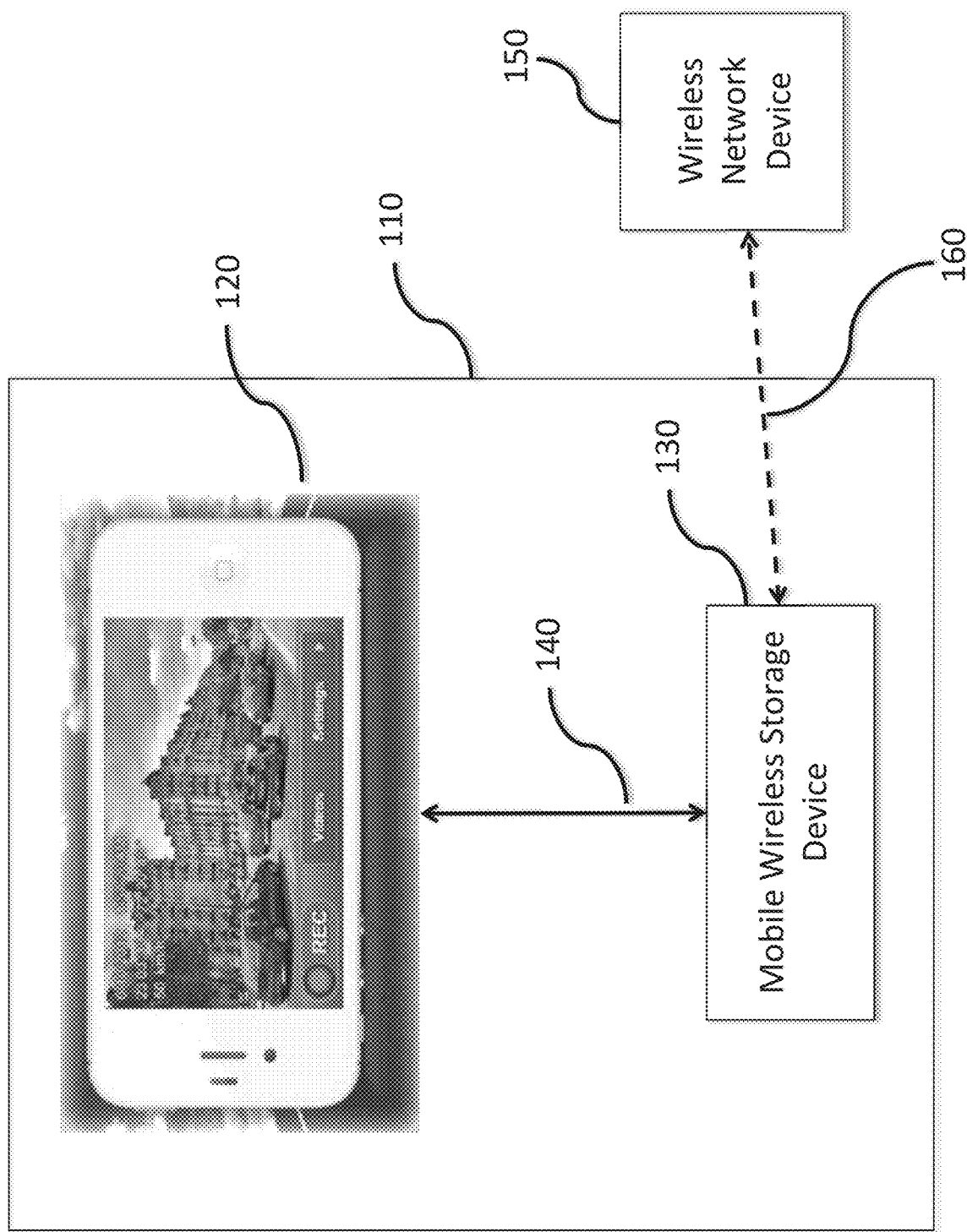
FIG. 2 is an example block diagram of the mobile video system of FIG. 1, which wirelessly communicates with a wireless network device to archive video information according to an embodiment of the present subject matter.

FIG. 2 is an example block diagram of the mobile video system of FIG. 1, which wirelessly communicates with a wireless network device 150 to archive video information according to an embodiment of the present subject matter. In various embodiments, wireless communications 160 are WiFi communications. In various embodiments, the wireless communications are BLUETOOTH-compatible communications. In various embodiments, the communications are IEEE 802.11 compatible communications. In various embodiments, the communications are IEEE 802.6 compatible communications. In various embodiments, the communications are WiMax compatible communications. Other short-range communications may be employed without departing from the scope of the present subject matter. In various embodiments, mobile wireless storage device 130 is a moving hard drive. In various embodiments, mobile wireless storage device 130 is a solid state drive. In various embodiments, mobile wireless storage device 130 is a combination of different storage devices.

Wireless network device 150 can be network connected to provide communications between the World Wide Web and the mobile wireless storage device 130. Therefore, mobile wireless storage device 130 can perform cloud-based communications with the mobile wireless storage device 130. This allows for video, audio, and other data to be stored in the cloud or retrieved from the cloud. Such retrieved information can be played by mobile video device 120. The files uploaded to the wireless network device 150 can be stored in storage devices connected to the wireless network device, and/or devices in communication with the wireless network device.

Figure 3:
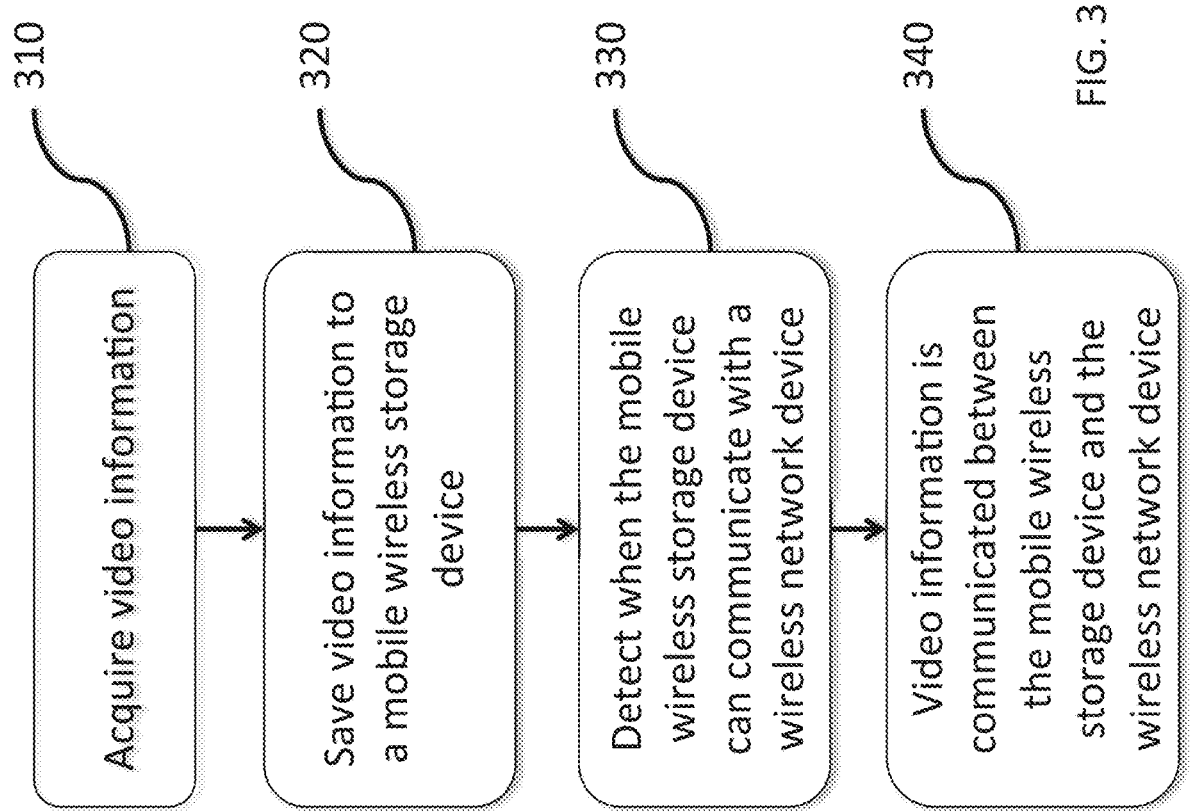
FIG. 3 is a flowchart of an example process that may be used to backup data saved to the external storage according to an embodiment of the present subject matter.

FIG. 3 is a flowchart of an example process that may be used to backup data saved to the external storage according to an embodiment of the present subject matter. In various embodiments, video information is acquired (310), such as by the mobile video device. The acquired video information is stored on the mobile wireless storage device (320). An event triggers communications between the mobile wireless storage device and the wireless network device (330). The video information is communicated between the mobile wireless storage device and the wireless network device (340).

In various embodiments, the video is archived using short-range radio communications. In various embodiments, the video information communication between the mobile wireless storage device and the wireless network device is triggered by proximity of the devices. Such communications can be triggered upon sensing a wireless signal strength or wireless connection between the devices. In various embodiments, the communications are manually initiated. In various embodiments, a geo-fence arrangement is used to trigger communications between the devices. In various embodiments a global positioning satellite (GPS) location sensing approach is used to trigger communications between the devices. In various embodiments, other triggers, such as those provided by location-based services are used to initiate archival via a wireless protocol. Other approaches are possible without departing from the scope of the present subject matter.

In some embodiments, the wireless network device 150 may communicate with, either alone or in any suitable combination, the Internet, an Intranet, a local Wi-Fi network, a wireless LAN, a mobile network (e.g., a 3G, 4G, 5G and/or LTE network), a LAN, a WAN, or any other suitable communication network. In some embodiments, the network may be a combination of communication networks.

In some embodiments, a program operating on the mobile video device, the mobile wireless storage device, or the wireless network device may include downloadable programs that may be transferred from a program store, such as provided by the Apple or Google applications stores. In various embodiments, a smart phone may be programmed with an application to communicate with the mobile wireless storage device 130 in either a wired or wireless configuration to save data. In various applications the mobile video device is a smart phone that also serves as a mobile wireless storage device, and is programmed to communicate with the wireless network device using short range communications, such as Wi-Fi or Bluetooth. In various embodiments, the smart phone is adapted to sense the wireless network device to initiate communications. In various embodiments, the smart phone uses location-based services to determine when to initiate communications. In various embodiments, the smart phone uses Wi-Fi signals to determined when to initiate communications. In various embodiments, the smart phone uses GPS signals to determined when to initiate communications. Embodiments such as these save the user the cost of data communications over the cellular network by employing other short range or long range radio communications with the wireless network device.

Figure 4:
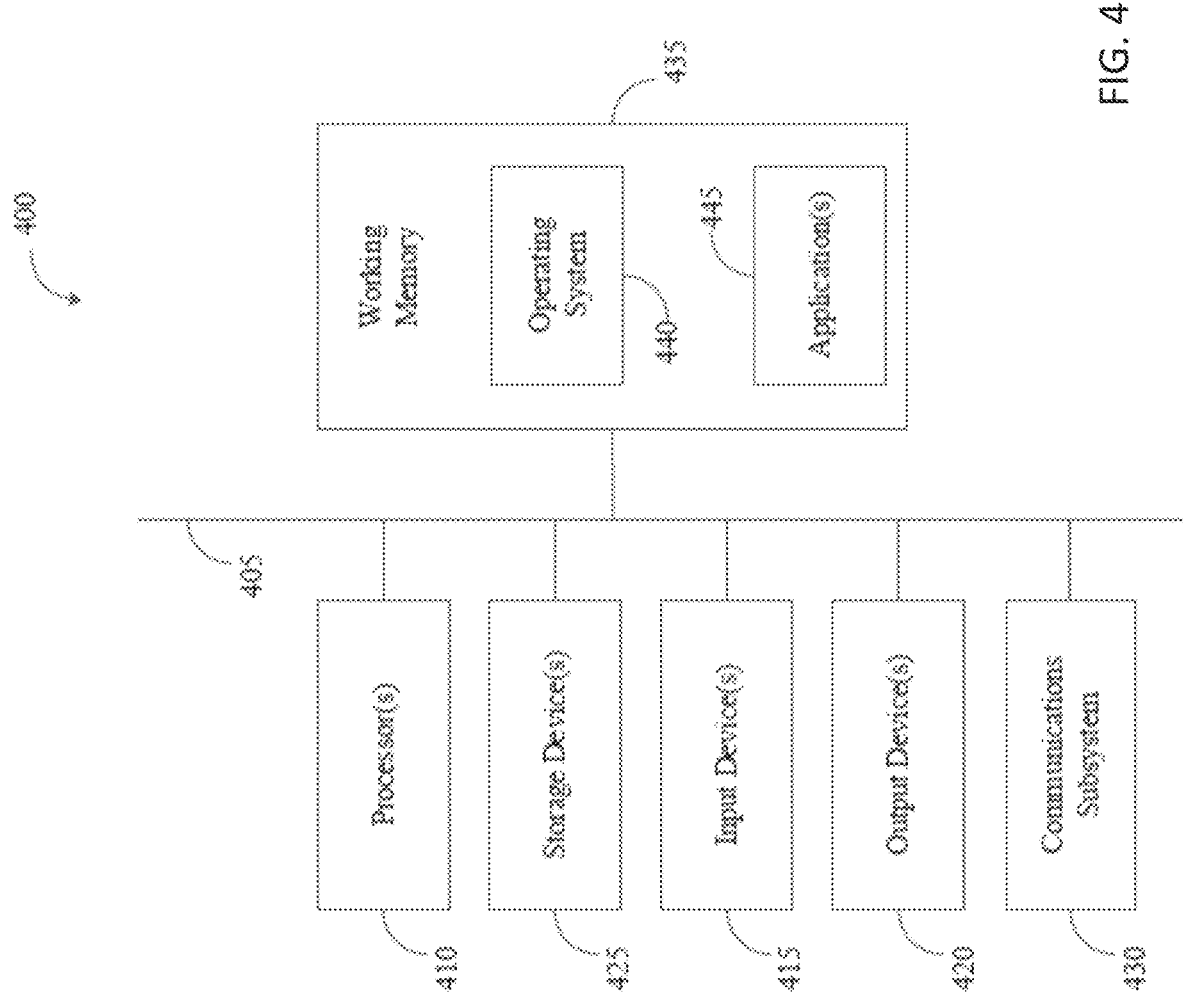
FIG. 4 is a block diagram of an illustrative computational system for performing functionality to facilitate implementation of embodiments described herein.

The computational system 400 (or processing unit) illustrated in FIG. 4 can be used to perform and/or control operation of any of the embodiments described herein. For example, the computational system 400 can be used alone or in conjunction with other components. As another example, the computational system 400 can be used to perform any calculation, solve any equation, perform any identification, and/or make any determination described here.

The computational system 400 may include any or all of the hardware elements shown in the figure and described herein. The computational system 400 may include hardware elements that can be electrically coupled via a bus 405 (or may otherwise be in communication, as appropriate). The hardware elements can include one or more processors 410, including, without limitation, one or more general-purpose processors and/or one or more special-purpose processors (such as digital signal processing chips, graphics acceleration chips, and/or the like); one or more input devices 415, which can include, without limitation, a mouse, a keyboard, and/or the like; and one or more output devices 420, which can include, without limitation, a display device, a printer, and/or the like.

The computational system 400 may further include (and/or be in communication with) one or more storage devices 425, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 400 might also include a communications subsystem 430, which can include, without limitation, a modem, a network card (wireless or wired), an infrared communication device, a wireless communication device, and/or chipset (such as a Bluetooth® device, a 802.6 device, a WiFi device, a WiMAX device, cellular communication facilities, etc.), and/or the like. The communications subsystem 430 may permit data to be exchanged with a network (such as the network described below, to name one example) and/or any other devices described herein. In many embodiments, the computational system 400 will further include a working memory 435, which can include a RAM or ROM device, as described above.

The computational system 400 also can include software elements, shown as being currently located within the working memory 435, including an operating system 440 and/or other code, such as one or more application programs 445, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 425 described above.

In some cases, the storage medium might be incorporated within the computational system 400 or in communication with the computational system 400. In other embodiments, the storage medium might be separate from the computational system 400 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 400 and/or might take the form of source and/or installable code, which, upon compilation and/or installation on the computational system 400 (e.g., using any of a variety of generally available compilers, installation programs, compression/decompression utilities, etc.), then takes the form of executable code.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

That which is claimed:

1. A system for recording video information using a smart phone in a vehicle having a dashboard and for storing the recorded video information using a wireless network device outside the vehicle, comprising:
a multipurpose mobile wireless storage device, physically and functionally independent of the smart phone, configured to receive the recorded video information from the smart phone when the smart phone and the multipurpose mobile wireless storage device are in the vehicle, the multipurpose mobile wireless storage device including data storage for storing the received video information, the multipurpose mobile wireless storage device further comprising short-range communications electronics configured to communicate with the wireless network device under control of the multipurpose mobile wireless storage device to archive the video information without using any wireless communication capability of the smart phone, the short-range communications electronics configured to detect a short-range communication signal indicative of a proximity of the wireless network device outside the vehicle and to trigger the archival of the video information upon a detection of the short-range communication signal, the short-range communication signal being a signal of a communication selected from short-range communications including one of a Wi-Fi communication and a BLUETOOTH communication; and an application for execution by the smart phone, the application configured to record the video information using the smart phone when the smart phone is mounted on the dashboard of the vehicle for recording the video information including driving information and to transmit the recorded video information to the multipurpose mobile wireless storage device.

2. The system of claim 1, wherein the application is further configured to delete from the smart phone the video information that has been transmitted by the smart phone to the multipurpose mobile wireless storage device.

3. The system of claim 1, wherein the application is further configured to use location-based services on the smart phone to instruct the multipurpose mobile wireless storage device to initiate communications with the wireless network device based on location of the smart phone.

4. The system of claim 1, wherein the short-range communications electronics includes Wi-Fi communications electronics.

5. The system of claim 1, wherein the short-range communications electronics includes BLUETOOTH communications electronics.

6. The system of claim 1, wherein the short-range communications electronics are configured to communicate with the smart phone and the wireless network device.

7. The system of claim 1, wherein the short-range communications electronics includes Wi-Fi communications electronics for communications with the wireless network device and BLUETOOTH communications electronics for communications with the smart phone.

8. The system of claim 7, wherein the application is further configured to use location-based services on the smart phone to instruct the multipurpose mobile wireless storage device to initiate communications with the wireless network device based on location of the smart phone.

9. The system of claim 7, wherein the application is further configured to instruct the multipurpose mobile wireless storage device to initiate communications with the wireless network device based on sensing a signal from the wireless network device.

10. A method for communicating data between a smart phone and a wireless network device, comprising:
   recording video information including driving information using the smart phone when the smart phone is mounted on a dashboard of a vehicle;
   receiving and storing the recorded video information from the smart phone using a multipurpose mobile wireless storage device in the vehicle, the multipurpose mobile wireless data storage being physically and functionally independent of the smart phone;
   detecting a short-range communication signal indicative of a proximity of the wireless network device outside the vehicle using wireless communication electronics of the multipurpose mobile wireless storage device, the short-range communication signal being a signal of a communication selected from short-range communications including one of a Wi-Fi communication and a BLUETOOTH communication; and
   transmitting, by the wireless communication electronics of the multipurpose mobile wireless storage device and without using any wireless communication capability of the smart phone, the video information stored in the multipurpose mobile wireless storage device to the wireless network device outside the vehicle upon detecting the short-range communication signal.

11. The method of claim 10, further comprising deleting video information on the multipurpose mobile wireless storage device after it is transmitted to the wireless network device.

12. The method of claim 10, further comprising saving the video information in the cloud using the wireless network device.

13. The method of claim 10, further comprising receiving files from the wireless network device using the multipurpose mobile wireless storage device, and storing the received files on the multipurpose mobile wireless storage device.

14. The method of claim 13, further comprising storing the received files on the smart phone.

15. The method of claim 10, wherein the detecting is based on signal strength of signals sensed by the multipurpose mobile wireless storage device from the wireless network device.

16. The method of claim 10, wherein detecting the short-range communication signal involves utilizing location-based services of the smart phone.

17. A non-transitory computer-readable storage medium including instructions that cause a multipurpose mobile wireless storage device in a vehicle to:
   receive video information from a smart phone mounted in the vehicle when the multipurpose mobile wireless storage device, which is physically and functionally independent of the smart phone, is in the vehicle, the video information recorded by the smart phone;
   store the received video information in the multipurpose mobile wireless storage device;
   detect a short-range communication signal indicative of a proximity of a wireless network device outside the vehicle using wireless communication electronics of the mobile wireless storage device, the short-range communication signal being a signal of a communication selected from short-range communications including one of a Wi-Fi communication and a BLUETOOTH communication; and
   transmit, by the wireless communication electronics of the multipurpose mobile wireless storage device and without using any wireless communication capability of the smart phone, the video information stored in the multipurpose mobile wireless storage device to the wireless network device outside the vehicle upon detection of the short-range communication signal.

18. The non-transitory computer-readable storage medium of claim 17, wherein the video information on the multipurpose mobile wireless storage device is deleted after it is transmitted to the wireless network device.

19. The non-transitory computer-readable storage medium of claim 17, wherein the video information is saved in the cloud using the wireless network device.

20. The non-transitory computer-readable storage medium of claim 17, wherein files from the wireless network device are stored on the multipurpose mobile wireless storage device.

* * * * *